(12) United States Patent
Moon

(10) Patent No.: US 9,775,120 B2
(45) Date of Patent: *Sep. 26, 2017

(54) PLURALITY OF BEACON SIGNALS TRANSMISSION METHOD FOR PROVIDING A PLURALITY OF BEACON SERVICES AND A BEACON SERVICE PROVISION METHOD USING THE BEACON SIGNALS

(71) Applicant: SK PLANET CO., LTD., Seongnam-si, Gyeonggi-do (KR)

(72) Inventor: SeungHoon Moon, Seoul (KR)

(73) Assignee: SK Planet Co., Ltd., Seongnam-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,326

(22) Filed: Dec. 29, 2016

(65) Prior Publication Data

US 2017/0111872 A1    Apr. 20, 2017

Related U.S. Application Data

(63) Continuation of application No. 14/954,400, filed on Nov. 30, 2015, now Pat. No. 9,572,093.

(30) Foreign Application Priority Data

Apr. 30, 2015    (KR) .......................... 10-2015-0061168

(51) Int. Cl.
    *H04B 5/00*    (2006.01)
    *H04W 52/32*    (2009.01)
    (Continued)

(52) U.S. Cl.
    CPC ......... *H04W 52/322* (2013.01); *H04W 4/008* (2013.01); *H04W 48/10* (2013.01)

(58) Field of Classification Search
    None
    See application file for complete search history.

(56) References Cited

U.S. PATENT DOCUMENTS

2002/0176388 A1    11/2002    Rankin et al.
2007/0130456 A1*    6/2007    Kuo ....................... H04W 12/06
                                                                    713/150

(Continued)

FOREIGN PATENT DOCUMENTS

KR    10-2003-0003741 A    1/2003

OTHER PUBLICATIONS

Kim, Cheol-Hoon; Hong, Seung-Hyun; Lee, Sung-Won, "A Research on Performance Improvement of iBeacon Using Transmission and Reception of Different Beacon Signals", The Journal of Korean Institute of Communications and Information Sciences, vol. 40, No. 01 (Jan. 2015).

(Continued)

*Primary Examiner* — Mohammed Rachedine
(74) *Attorney, Agent, or Firm* — Hauptman Ham, LLP

(57) ABSTRACT

Provided are a beacon service method, apparatus, and system for providing a plurality of services using one beacon device by allowing the beacon device to broadcast a plurality of beacon signals for providing the plurality of services to a certain user terminal. The beacon device includes a first communication module configured to broadcast a beacon signal, a storage module configured to store transmission information for a plurality of beacon signals, and a control module configured to use the transmission information for the plurality of beacon signals stored in the storage module to control the first communication module to alternately broadcast the plurality of beacon signals.

4 Claims, 10 Drawing Sheets

(51) Int. Cl.
*H04W 48/10* (2009.01)
*H04W 4/00* (2009.01)

(56) References Cited

U.S. PATENT DOCUMENTS

2012/0057620 A1 3/2012 Yamamoto et al.
2015/0319688 A1* 11/2015 Matas Sanz ...... H04W 52/0206
455/574

OTHER PUBLICATIONS

Korean Office Action dated Jan. 29, 2016, Korean Application No. 10-2015-0061168.

* cited by examiner

FIG. 8

| Transmission Information | Item | size(byte) | Value | Unit |
|---|---|---|---|---|
| Overall Beacon Signal Information | Number Of Beacon Signals | 2 | 2 | |
| | Transmission Duration | 4 | 30000 | sec |
| | Number Of Repetitions | 4 | 10000 | Times |
| | Overall Signal Interva | 4 | 500 | msec |
| | Other Information | Variable | ver 1.0 | |
| Individual Information Of Beacon Signal 1 | Beacon Signal NO. | 1 | 1 | |
| | UUID | 16 | | |
| | Major ID | 2 | 1 | |
| | Minor ID | 2 | 1 | |
| | Transmission Power Intensity | 1 | 50 | dBm |
| | Individual Signal Power | 2 | 0 | msec |
| | Other Information | Variable | | |
| Individual Information Of Beacon Signal 2 | Beacon Signal NO. | 1 | 2 | |
| | UUID | 16 | | |
| | Major ID | 2 | 1 | |
| | Minor ID | 2 | 2 | |
| | Transmission Power Intensity | 1 | 70 | dBm |
| | Individual Signal Interval | 2 | 0 | msec |
| | Other Information | Variable | | |

PLURALITY OF BEACON SIGNALS TRANSMISSION METHOD FOR PROVIDING A PLURALITY OF BEACON SERVICES AND A BEACON SERVICE PROVISION METHOD USING THE BEACON SIGNALS

CROSS-REFERENCE TO RELATED APPLICATION

This present application is a continuation of U.S. patent application Ser. No. 14/954,400 filed Nov. 30, 2015, which is based on and claims priority to Korean Patent Application No. 10-2015-0061168 filed in the Korean Intellectual Property Office on Apr. 30, 2015. The disclosures of the above-listed applications are hereby incorporated by reference herein in their entirety.

TECHNICAL FIELD

The present invention relates to a solution for providing a beacon service, and more particularly, to a beacon service method, apparatus, and system for providing a plurality of services using one beacon device.

BACKGROUND

This section is intended to merely provide background for embodiments of the present invention and is not considered prior art in the claims.

With the development of mobile communication networks and the advance in terminal specifications, mobile communication terminals have become the necessity for modern people and have evolved into total entertainment equipment beyond typical simple communication devices or information providing devices.

Further, technologies for performing short-range wireless communication between devices that are located within a short distance are being rapidly developed.

In this communication, a near field communication (NFC)-based service capable of transmitting and receiving desired data through bidirectional communication when a mobile communication terminal comes in contact with a point of sale (POS) terminal installed in a store or a beacon-based service capable of periodically transmitting a signal using an electromagnetic or acoustic wave, driving a specific application of a nearby mobile communication terminal, and providing desired content is used.

In this case, services provided by service providers may include services in various fields such as promotion, finance, payment, games, or the like, which are currently provided on the wired/wireless Internet, for example, a comparative simple promotion page service, a service for downloading a low-priced discount coupon, a service for paying for a product purchased in a store, and a service for downloading applications such as a game to users.

However, generally, the beacon service has a shortcoming in that one beacon device transmits unique identification information (e.g., a beacon ID) and only one service.

In addition, in order to overcome such a shortcoming, several services in one service page may be provided through a menu link. However, when a period of an individual service has elapsed, the service ends, and thus a change of a page, such as deletion of a page, is needed.

PRIOR ART DOCUMENT

Patent Document

Korean Patent No. 10-1220911 published on Jan. 11, 2013, entitled "The System for Tracking a Position Based on the Local Area Wireless Communication Network and the Method Thereof"

SUMMARY

The present invention is directed to providing a plurality of beacon services using one beacon device installed in a shop. In particular, the present invention is directed to providing a service method, apparatus, and system, in which one beacon device uses the transmission information for generating the plurality of signals to transmit a plurality of beacon signals corresponding to the services.

One aspect of the present invention provides a beacon device including: a first communication module configured to broadcast a beacon signal; a storage module configured to store transmission information for a plurality of beacon signals; and a control module configured to use the transmission information for the plurality of beacon signals stored in the storage module to control the first communication module to alternately broadcast the plurality of beacon signals.

The beacon device may further include a second communication module configured to transmit and receive data to and from a beacon signal management server, in which the transmission information for the plurality of beacon signals is received from the beacon signal management server through the second communication module.

The transmission information may include overall information commonly applied to the plurality of beacon signals and individual information individually applied to each of the plurality of beacon signals.

The overall information may include one or more of the number of beacon signals, the number of repetitions of the beacon signals, an interval between the beacon signals, and a beacon signal transmission duration, and the individual information may include one or more of first identification information, second identification information, and a transmission power intensity.

Another aspect of the present invention provides a beacon service system including: a beacon signal management server; and a beacon device, in which the beacon signal management server is configured to transmit and receive data in communication with the beacon device and transmit transmission information for a plurality of beacon signals to the beacon device, the transmission information being used by an administrator to control the beacon signals broadcasted from the beacon device, and in which the beacon device is configured to receive the transmission information for the plurality of beacon signals from the beacon signal management server and alternately broadcast the plurality of beacon signals based on the transmission information.

Still another aspect of the present invention provides a beacon service method in a beacon device, the beacon service method including: storing transmission information for a plurality of beacon signals; and using the stored transmission information for the plurality of beacon signals to alternately broadcast the plurality of beacon signals.

The beacon service method may further include receiving the transmission information for the plurality of beacon signals from the beacon signal management server before the storing.

Yet another aspect of the present invention provides a computer-readable recording medium storing a computer program for executing the beacon service method.

According to an embodiment of the present invention, one beacon device can provide a plurality of services while one conventional beacon device can provide only one service.

In addition, when the beacon signal management server is used, it is possible to simply change the transmission information of the beacon signal.

Thus, according to an embodiment of the present invention, a plurality of beacon device are not needed to provide the plurality of services, thereby reducing installation and operating costs of the beacon device.

The effect of the present invention is not limited to the aforesaid, but other effects not described herein will be clearly understood by those skilled in the art from descriptions below.

BRIEF DESCRIPTION OF DRAWINGS

FIG. 8 is a view showing an example of transmission information that is set when one beacon device provides a plurality of beacon services according to an embodiment of the present invention.

DETAILED DESCRIPTION

Figure 1:
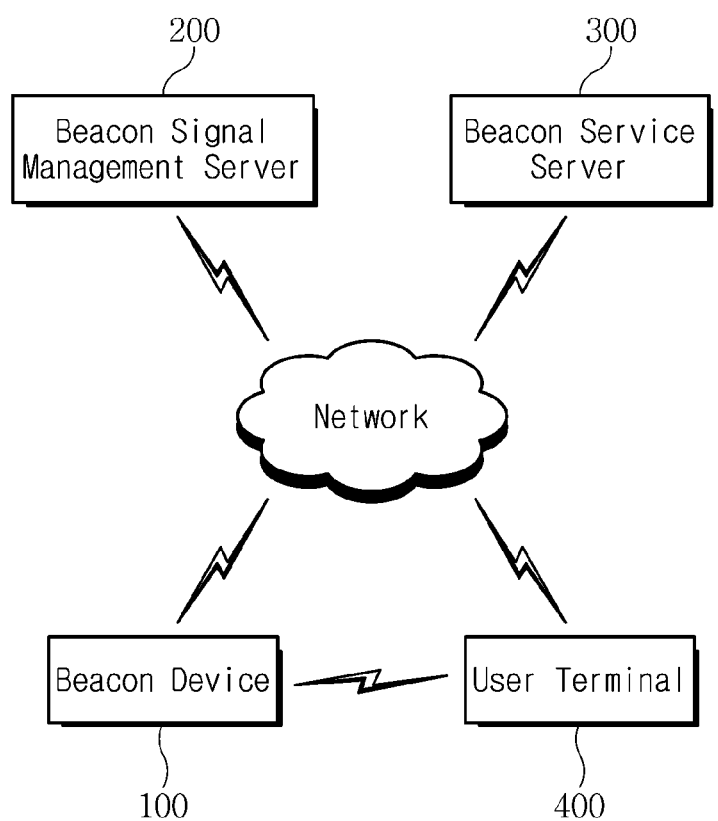
FIG. 1 is a block diagram showing a beacon service system according to an embodiment of the present invention.

Hereinafter, exemplary embodiments of the present invention will be described in detail with reference to the accompanying drawings. The features and advantages of aspects of the present invention will become more apparent from the detailed description set forth below.

However, detailed descriptions related to well-known functions or configurations will be ruled out in order not to unnecessarily obscure the subject matter of the present invention. In addition, it should be noted that like reference numerals denote like elements throughout the specification and drawings.

The terms or words used in the specification and claims should not be construed as being limited to typical or dictionary meanings, but should be construed as the meaning and concept corresponding to the technical idea of the present invention on the basis of the principle that an inventor can appropriately define the concept of the term for describing his or her invention in the best manner. Accordingly, the configurations illustrated in embodiments and drawings described in the specification do not represent the technical idea of the present invention but are just exemplary embodiments. Thus, it should be understood that various equivalents and modifications may exist which can be replaced at the time of filing an application.

While the terms including an ordinal number, such as "first," "second," etc. may be used herein to describe various elements, such elements are not limited to those terms. For example, a first component may be named a second component without departing from the scope of the present invention and the second component may also be similarly named the first component.

It is to be understood that when one element is referred to as being "connected to" or "coupled to" another element, it may be connected or coupled logically or physically. In other words, it is to be understood that one element may be directly connected or coupled to another element or indirectly connected or coupled to another element with a third element intervening therebetween.

In the following description, the technical terms are used only for explaining a specific exemplary embodiment while not limiting the present disclosure. An expression used in the singular encompasses the expression of the plural, unless it has a clearly different meaning in the context. It will be further understood that the terms "include," "comprise," or "have" used in this specification, specify the presence of stated features, steps, operations, components, parts, or combinations thereof, but do not preclude the presence or addition of one or more other features, numerals, steps, operations, components, parts, or combinations thereof.

Embodiments within the scope of the present invention also include computer-readable media for carrying or storing computer-executable instructions and/or data structures. Such computer-readable media can be any available media that can be accessed by a general purpose or special purpose computer system. Thus, by way of example, and not limitation, the computer-readable media can include physical computer-readable storage media including RAM, ROM, EEPROM, CD-ROM or other optical disk storage, magnetic disk storage or other magnetic storage devices, or any other medium which can be used to store or deliver desired program code means in the form of computer-executable instructions, computer-readable instructions, or data structures and which can be accessed by a general purpose or special purpose computer.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 is a block diagram showing a beacon service system according to an embodiment of the present invention.

Referring to FIG. 1, a beacon service system according to an embodiment of the present invention may include a beacon device 100, a beacon signal management server 200, a beacon service sever 300, and a user terminal 400.

The beacon device 100 according to an embodiment of the present invention is a reference node for a location-based service. In the location-based service system, a location of the user terminal 400 may be calculated on the basis of location information of the beacon device 100 and information on a distance between the beacon device 100 and the user terminal 400, and a predetermined location-based service may be provided to user terminals 400 adjacent with respect to the beacon device 100. The location-based service refers to a service that is provided based on location information or provided only in a predetermined region, and may include, but is not limited to, a mobile payment service limited to a specific affiliate, a shop information service, a coupon providing service, and a geo-fence service that is performed within a predetermined region with respect to a reference point. The beacon device 100 may be used as a reference point for selecting a service target in the location-based service.

The beacon device 100 is fixedly installed at a certain location to broadcast a beacon signal at certain periods and inform its own location to the user terminal 400 that approaches the beacon device 100. The user terminal 400 receives information for the location-based service using the received beacon signal. Here, the beacon signal may include information for identifying the beacon device 100, that is, identification information that is uniquely assigned for each beacon device 100.

Here, the identification information may include, for example, one or more of first identification information, that is, a universally unique identifier (UUID) standardized by the Open Software Foundation (OSF) and second identification information, which has a lower rank than the UUID, that is, a major code and a minor code for identifying a service target or location.

In this case, the beacon device 100 and the user terminal 400 may communicate on the basis of various short-distance communication technologies, for example, Bluetooth low energy (BLE) communication technology. Particularly, the beacon device 100 may operate in a peripheral mode defined in the BLE and broadcast a beacon signal to nearby user terminals 400.

In an embodiment of the present invention, in order for the user terminal 400 to receive a plurality of beacon services from the beacon service server 300, the beacon device 100 may broadcast a plurality of beacon signals mapped to different pieces of service information.

Accordingly, the user terminal 400 that approaches the beacon device 100 according to an embodiment of the present invention may receive a plurality of beacon services through the beacon device 100.

Furthermore, the beacon device 100 may support the location-based service in cooperation with the beacon service server 300 through a network. For reference, the term "network" is defined as one or more data links that allow electronic data to be transmitted between computer systems and/or modules. When information is transferred or provided over a network or another communications connection (either hardwired, wireless, or a combination of hardwired or wireless) to a computer system, the computer system properly views the connection as a computer-readable medium. The computer-readable instructions include, for example, any instructions and data which cause a general purpose computer system or special purpose computer system to perform a certain function or group of functions. The computer-executable instructions may be, for example, binaries, intermediate format instructions such as assembly language, or even source code.

In this case, the network may include various forms of communication networks that have been already established. For example, the network may include a wireless communication type, such as wireless LAN (WLAN), Wi-Fi, Wibro, Wimax, and High Speed Downlink Packet Access (HSDPA), and a wired communication type, such as the Ethernet, xDSL (ADSL, VDSL), a hybrid fiber coaxial cable (HFC), fiber to the curb (FTTC), and fiber to the home (FTTH) according to a system implementation scheme.

Moreover, the network may include, for example, a plurality of access networks and core networks and may further include an external network, for example, the Internet network. Here, each of the access networks is an access network that performs wired/wireless communication with the user terminal 400 and may be implemented as a plurality of base stations such as a base station (BS), a base transceiver station (BTS), a NodeB, and an eNodeB and a base station controller such as a radio network controller (RNC). In addition, as described above, a digital signal processing unit and a wireless signal processing unit that were integrally implemented in the base station are separated into a digital unit (hereinafter referred to as a DU) and a radio unit (hereinafter referred to as an RU), respectively. A plurality of RUs may be installed in a plurality of regions and may be connected with a centralized DU.

In addition, a core network constituting a mobile network along with an access network serves to connect the access network with an external network, for example, the Internet network.

As described above, the core network is a network system that performs a main function for a mobile communication service of mobility control and switching between access networks and is configured to perform circuit switching or packet switching and manage and control packet flow in the mobile network. In addition, the core network (not shown) may serve to manage mobility between frequencies and interoperate between traffic in the access network (not shown) and the core network (not shown) and another network, for example, the Internet network (not shown). The core network (not shown) may further include a serving gateway (SGW), a PDN gateway (PGW), a mobile switching center (MSC), a home location register (HLR), a mobile mobility entity (MME), and a home subscriber server (HSS).

In addition, the Internet network (not shown) may denote a typical open communication network through which information is exchanged according to a TCP/IP protocol, that is, a public network and may be connected with the beacon service server 300 and configured to provide information provided from the beacon service server 300 to the user terminal 400 via the core network (not shown) and the access network (not shown) and provide information provided from the user terminal 400 to the beacon service server 300 via the core network (not shown) and the access network (not shown).

The beacon device 100 and the user terminal 400 may cooperate through short-range communication technologies using WiFi, Bluetooth low energy (BLE), Zigbee, or ultrasonic waves.

In an embodiment of the present invention, the network may also include other communication types that are widely known or will be developed in the future, in addition to the above communication types.

The beacon signal management server 200 is configured to manage the beacon device 100 and may remotely transfer, to the beacon device 100, transmission information for a plurality of beacon signals to be broadcast by the beacon device 100. There may or may not be the beacon signal management server 200 in the beacon service system according to the service convenience of a service provider.

The transmission information is information needed when the beacon device 100 broadcasts a plurality of beacon signals. For example, the transmission information may include overall information for generating the plurality of beacon signals of the beacon device and individual information regarding each of the plurality of beacon signals.

In detail, the overall information may include the number of beacon signals, the number of repetitions of the beacon signals, an interval between beacon signals, and a beacon signal transmission duration, and the individual information may include first individual information, second individual information, and transmission power intensity.

Here, the identification information may include, for example, one or more of first identification information, that is, a universally unique identifier (UUID) standardized by the Open Software Foundation (OSF) and second identification information, which has a lower rank than the UUID, that is, a major code and a minor code for identifying a service target or location.

In addition, the beacon signal management server 200 may manage a state of each beacon device 100 by communication with the beacon device 100 over a network.

Next, the beacon service server 300 provides a location-based service in communication with one or more of the beacon device 100 and the user terminal 400. For example, the beacon service server 300 may manage a state of each beacon device 100 by communication with the beacon device 100 over a network.

Furthermore, the beacon service server 300 may provide the location-based service to the user terminal 400 by communication with the user terminal 400 that has recognized the beacon device 100 over a network.

Next, the user terminal 400 is a device of a user who uses or receives the location based service. The user terminal 400 may be implemented as an electronic device that may transmit or receive various types of data via a network according to a key manipulation of the user. To this end, the user terminal 400 may include a computing environment such as a memory for storing programs and protocols and a microprocessor for executing any type of program to perform calculation and control functions.

For example, the user terminal 400 may be any one of a tablet PC, a laptop, a personal computer (PC), a smart phone, a personal digital assistant (PDA), a smart TV, a mobile communication terminal, etc.

Particularly, the user terminal 400 according to an embodiment of the present invention should have a short-distance communication function of communicating with the beacon device 100, for example, a BLE function.

In this case, the user terminal 400 may interoperate with the beacon device 100 in a disconnection scheme or in a connection scheme.

In particular, the user terminal 400 operates in a central mode defined in the BLE and performs a scanning procedure or discovery procedure to detect a nearby beacon device 100. Through the detection of the beacon device 100, the user terminal 400 may receive a beacon signal broadcast from the beacon device 100 positioned within a communication-enabled distance, cooperate with the beacon service server 300 on the basis of information extracted from the received beacon signal, and receive a corresponding location-based service (e.g., a mobile payment service limited to a specific affiliate, a shop information service, a coupon providing service, and a geo-fence service that is performed within a predetermined region with respect to a reference point).

In this case, the user terminal 400 may receive the location-based service although the user terminal 400 is not connected with the beacon device 100.

As another example, the user terminal 400 may receive location information from one or more beacon devices 100 that are located nearby, estimate a distance between the one or more beacon devices 100, and calculate its own location.

In the above-described location-based service system, the configuration of the beacon device 100 will be described in detail with reference to FIG. 3.

Before the detailed description of the configuration and operation of the beacon service system according to an embodiment of the present invention, the following description will be made on a computing environment in which the configuration and operation are performed according to an embodiment of the present invention.

Figure 2:
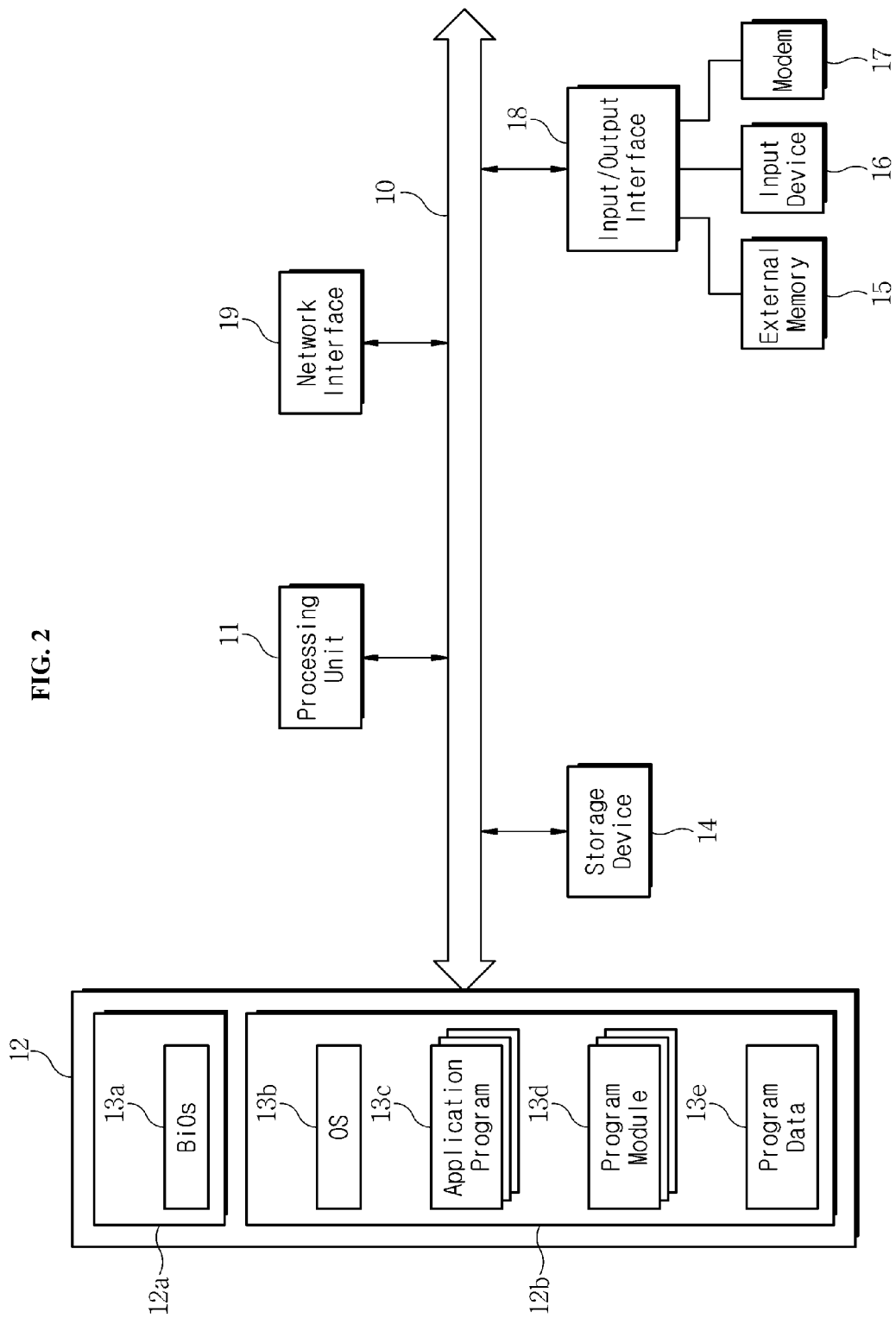
FIG. 2 is a block diagram showing a detailed configuration of a beacon device and a beacon signal management server in a beacon service system according to an embodiment of the present invention.

Elements of the beacon service system according to an embodiment of the present invention, in particular, the beacon device 100, the beacon signal management server 200, the beacon service server 300, and the user terminal 400 may be configured to operate on the basis of the computing system as shown in FIG. 2.

FIG. 2 and the following discussion are intended to provide a brief, general description of a suitable computing environment in which the present invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

Referring to FIG. 2, an example computing system for implementing the invention includes a general-purpose computing device in the form of a computer system including a processing unit 11, a system memory 12, and a system bus 10 that couples various system components including the system memory 12 to the processing unit 11.

The processing unit 11 may execute computer-executable instructions designed to implement features of the present invention.

The system bus 10 may be any of several types of bus structures including a memory bus or memory controller, a peripheral bus, and a local bus using any of a variety of bus architectures. The system memory 12 includes a read only memory (ROM) 12a and a random access memory (RAM) 12b. A basic input/output system (BIOS) 13a, containing the basic routines that help transfer information between elements within computing system, such as during start-up, may be stored in the ROM 12a.

The computing system may include a storage unit. An example of the storage unit may be a storage device 14.

The storage device 14 may include, for example, a hard disk drive for reading information from or writing information to a hard disk, a magnetic disk drive for reading information from and writing information to a magnetic disk, and an optical disk drive for reading information from or writing information to an optical disk, such as a CD-ROM or other optical media. The hard disk drive, magnetic disk drive, and optical disk drive are connected to the system bus 10 by a hard disk drive interface, a magnetic disk drive interface, and an optical drive interface, respectively.

In addition, the computing system may further include an external memory 15 as the storage device. The external memory 15 may be connected to the system bus 10 through an input/output interface 18.

The drives and their associated computer-readable media provide nonvolatile storage of computer-executable instructions, data structures, program modules, and other data. Although the example environment described herein employs the hard disk, the magnetic disk and the optical disk as the non-volatile storage device 14, other types of computer-readable media for storing data may be used, including magnetic cassettes, flash memory cards, digital versatile disks, RAMs, ROMs, and the like.

Program code means including one or more program modules may be stored in the storage device 14, ROM 12a, and RAM 12b, including an operating system 13b, one or more application programs 13c, other program modules 13d, and program data 13e, which are loaded and executed by the processing unit 11.

Moreover, a user may enter commands and information into the computing system through a keyboard, a pointing device, or other input devices 16, such as a microphone, joy stick, game pad, scanner, or the like. These input devices 16 can be connected to the processing unit 11 through the input/output interface 18 coupled to the system bus 10. The input/output interface 18 logically represents any of a wide variety of possible interfaces, such as a serial port interface, a PS/2 interface, a parallel port interface, a Universal Serial Bus (USB) interface, or an Institute of Electrical and Electronics Engineers (IEEE) 1394 interface (i.e., a FireWire interface), or may even logically represent a combination of different interfaces.

In addition, the computer system is connectable to networks, such as, for example, an office-wide or enterprise-wide computer network, a home network, an intranet, and/or the Internet. The computer system can exchange data with external sources, such as, for example, remote computer systems, remote applications, and/or remote databases over such networks.

The computing system according to an embodiment of the present invention includes a network interface 19, through which the computer system receives data from external sources and/or transmits data to external sources.

The network interface 19 can logically represent one or more software and/or hardware modules, such as, for example, a network interface card and corresponding Network Driver Interface Specification (NDIS) stack. The network interface 19 may support various communication protocols.

For example, the network interface 19 may support various mobile communication standards such as Advanced Mobile Phone System (AMPS), Code Division Multiple Access (CDMA), Global System for Mobile Communications (GSM), Wideband Code Division Multiple Access (WCDMA), High-Speed Downlink Packet Access (HSDPA), Long Term Evolution (LTE), and, LTE Advanced (LTE-A), and also short-range wireless network technologies such as Bluetooth low energy (BLE) and Zigbee.

Likewise, the computer system receives data from external sources and/or transmits data to external sources through the input/output interface 18. The input/output interface 18 may be coupled to a modem 17 (e.g., a standard modem, a cable modem, or a digital subscriber line (DSL) modem), through which the computer system receives data from and/or transmits data to external sources.

While FIG. 2 represents a suitable operating environment for the present invention, the principles of the present invention may be employed in any system that is capable of, with suitable modification if necessary, implementing the principles of the present invention. The environment illustrated in FIG. 2 is illustrative only and by no means represents even a small portion of the wide variety of environments in which the principles of the present invention may be implemented.

The configuration and function according to an embodiment of the present invention may be implemented as a program, and stored in and accessed by any computer-readable storage medium associated with the computing system as shown in FIG. 2. For example, portions of such program modules for performing functions according to an embodiment of the present invention and portions of associated program data may be included in an operating system 13b, application programs 13c, program modules 13d and/or program data 13e.

When a mass storage device, such as a hard disk, is coupled to the computer system, such program modules and associated program data may also be stored in the mass storage device. In a networked environment, program modules for performing a function according to the present invention, or portions thereof, can be stored in remote memory storage devices, such as, for example, a system memory and/or mass storage devices associated with a remote computer system connected through a modem of the input/output interface 18 or the network interface 19, for example, computing systems of the beacon device 100 and the beacon signal management server 200. As described above, execution of such modules may be performed in a distributed environment.

In a beacon service system implemented on the basis of the above-described computing system, a detailed configuration of each device according to an embodiment of the present invention will be described in detail with reference to the accompanying drawings. A module constituting each device, which will be described below, denotes an element that performs a certain function implemented in software, hardware, or a combination thereof. For example, the module is a program module stored in a storage medium of the computing system as shown in FIG. 2 and may be executed by the processing unit 11.

Figure 3:
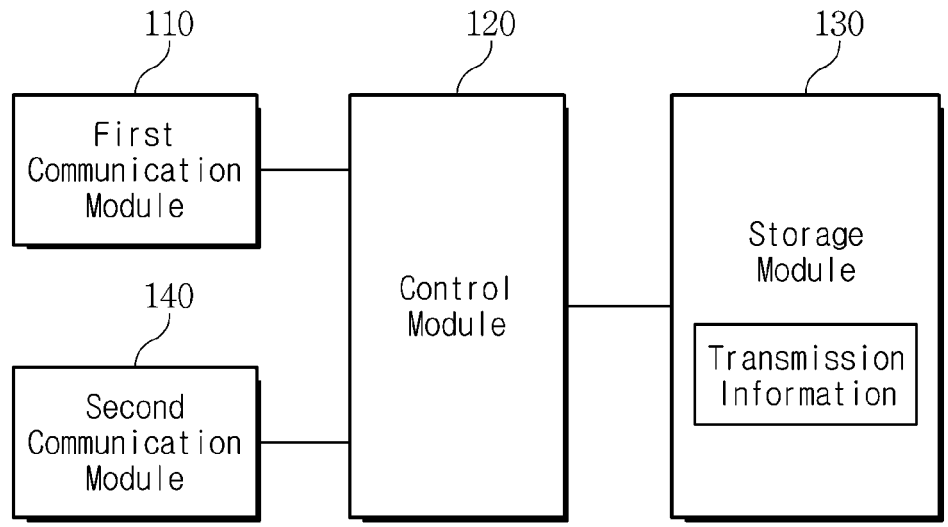
FIG. 3 is a block diagram illustrating a configuration of a beacon device according to an embodiment of the present invention.

FIG. 3 is a block diagram illustrating the configuration of the beacon device 100 according to an embodiment of the present invention.

Referring to FIG. 3, the beacon device 100 according to an embodiment of the present invention may basically include a first communication module 110, a control module 120, and a storage module 130 and may further include a second communication module 140.

The first communication module 110 is configured to broadcast a beacon signal to the user terminal 400 adjacent to a nearby communication-enabled range on the basis of the Bluetooth low energy (BLE) technology. Particularly, the first communication module 110 included in the beacon device 100 may operate in a peripheral mode defined in the BLE.

In detail, the first communication module 110 operates according to control of the control module 120 and broadcasts the beacon signal. Here, the beacon signal broadcast by the first communication module 110 may include unique identification information assigned to the beacon device 100 such that the user terminal 400 may identify the beacon device 100. Here, the identification information may include, for example, one or more of first identification information, that is, a universally unique identifier (UUID) standardized by the Open Software Foundation (OSF) and second identification information, which has a lower rank than the UUID, that is, a major code and a minor code for identifying a service target or location.

The control module 120 is configured to control an overall operation of the beacon device 100 according to an embodiment of the present invention. The control module 120 controls the first communication module 110 to broadcast a beacon signal such that the nearby user terminal 400 may recognize the beacon device 100. In particular, in an embodiment of the present invention, the control module 120 may control the first communication module 110 to broadcast a plurality of beacon signals.

In this case, the control module 120 may control the first communication module 110 to alternately broadcast a plurality of beacon signals according to the transmission information.

The storage module 130 is a means for storing data or a program needed for an operation of the beacon device 100. In particular, the storage module 130 may store information to be broadcast to the user terminal through the first communication module 110. The information may include, for example, information on a location where the beacon device 100 is installed.

Moreover, the storage module 130 may store identification information of the beacon device 100 to be included in the beacon signal that is broadcast through the first communication module 110. In addition, the storage module 130 may store the transmission information for the plurality of beacon signals that are broadcast through the first communication module 110.

Accordingly, the first communication module 110 may access the storage module 130, read the information stored in the storage module 130, and transmit the information to the user terminal 400 according to control of the control module 120.

Next, the second communication module 140 is configured to transmit and receive data over a network. In detail, the second communication module 140 may access the beacon service server 300 or the beacon signal management server 200 over a network to transmit and receive data for managing the beacon service server 300 and the beacon device 100 or providing a location-based service to the user terminal 400. For example, the second communication module 140 may receive data from the beacon service server 300 and transmit the received data to the user terminal 400.

In addition, through the second communication module 140, the beacon device 100 may receive the transmission information for broadcasting the plurality of beacon signals from the beacon signal management server 200.

The second communication module 140 may operate on the basis of a different communication technology from the first communication module 110 and may be implemented as any one of a WiFi communication module, a Zigbee communication module, a mobile communication module, an optical communication module, a cable communication module, and a wired Internet communication module according to communication technology applied to the network.

Figure 4:
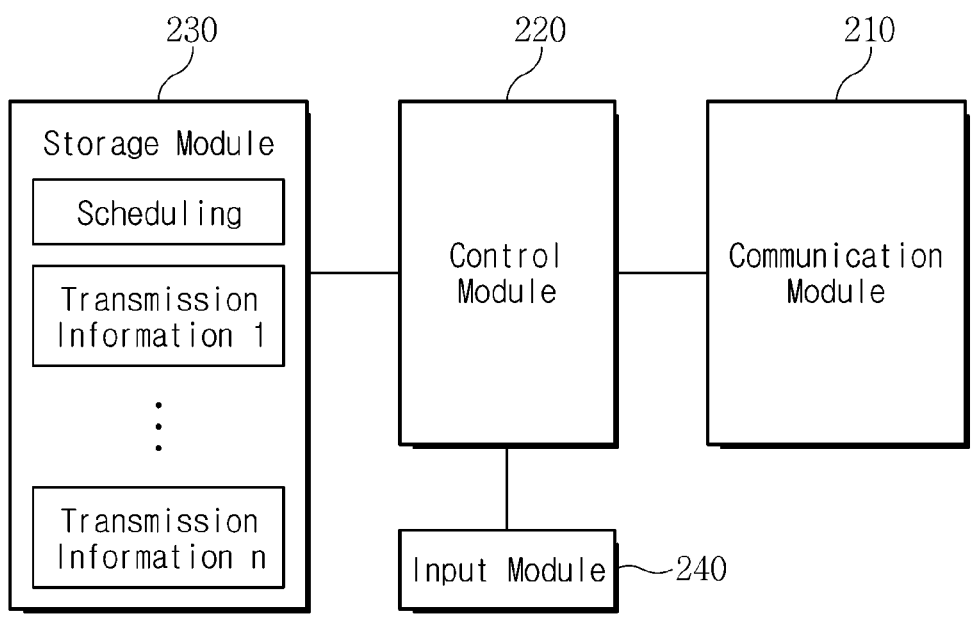
FIG. 4 is a block diagram illustrating a configuration of a beacon signal management server according to an embodiment of the present invention.

FIG. 4 is a block diagram illustrating a configuration of a beacon signal management server according to an embodiment of the present invention.

Referring to FIG. 4, a beacon signal management server 200 according to an embodiment of the present invention basically includes a communication module 210, a control module 220, a storage module 230, and an input module 240.

The communication module 210 is configured to transmit and receive data over a network. In detail, the communication module 210 may access the beacon device 100 over a network and transmit and receive data for managing the beacon device 100.

For example, through the communication module 210, the beacon signal management server 200 may transmit the transmission information for broadcasting the plurality of beacon signals to the beacon device 100.

The communication module 210 may be implemented as any one of a WiFi communication module, a Zigbee communication module, a mobile communication module, an optical communication module, a cable communication module, and a wired Internet communication module according to communication technology applied to the network.

The control module 220 is configured to control an overall operation of the beacon signal management server 200 according to an embodiment of the present invention. The control module 120 may transmit the transmission information used for the beacon device 100 to broadcast the plurality of beacon signals to the beacon device 100 through the communication module 210.

In addition, the control module 220 may store scheduling information input through the input module in the storage module 230 in addition to the transmission information. The scheduling information is information for transmitting the transmission information to the beacon device 100 according to a planned schedule when there are a plurality of pieces of transmission information.

The storage module 230 is means for storing data needed for an operation of the beacon device 100. In particular, the storage module 230 may store data to be broadcast to the user terminal 400 through the first communication module 110 of the beacon device 100. The data may include, for example, information on a location where the beacon device 100 is installed.

Moreover, the storage module 230 may store identification information of the beacon device 100 to be included in the beacon signal that is broadcast through the first communication module 110 of the beacon device 100. In addition, the storage module 230 may store transmission information of the beacon device 100 to be included in the plurality of beacon signals that are broadcast through the first communication module 110 of the beacon device 100. For example, the transmission information may include overall information for generating the plurality of beacon signals of the beacon device and individual information regarding each of the plurality of beacon signals. In detail, the overall information may include the number of beacon signals, the number of repetitions of the beacon signals, an interval between beacon signals, and a beacon signal transmission duration, and the individual information may include first individual information, second individual information, and transmission power intensity. Here, the identification information may include, for example, one or more of first identification information, that is, a universally unique identifier (UUID) standardized by the Open Software Foundation (OSF) and second identification information, which has a low rank than the UUID, that is, a major code and a minor code for distinguishing between service targets or locations.

In addition, when there are the plurality of pieces of transmission information, the storage module 230 may store the scheduling information that allows the transmission information to be transmitted to the beacon device 100 according to the planned schedule. For example, the scheduling information may include date information and time information that are used to determine when the beacon signal management server 200 transmits the transmission information to the beacon device 100 and order information that is used to determine whether the beacon signal management server 200 transmits the plurality of pieces of transmission information sequentially, selectively, or randomly.

Accordingly, the communication module 210 may access the storage module 230, read the transmission information stored in the storage module 230, and transmit the transmission information to the beacon device 100 according to control of the control module 220.

In addition, the communication module 210 may read the scheduling information stored in the storage module 230 and transmit the transmission information to the beacon device 100 in an appropriate order at a planned date and time according to control of the control module 220.

Lastly, the input module 240 is connected with an external device (not shown) and configured to input data between the external device and the control module 220. The input module 240 enables the beacon signal management server 200 to be controlled or managed through the external device. For example, the input module 240 may be a general purpose input output (GPIO) module. For reference, the GPIO is a general purpose input/output interface in which a connector is not fixed and is selectively used for input or output, and may include a GPIO pin direction register (GPDR) for setting an input/output direction of the connector, an output circuit for outputting data through the connector, and an input circuit for inputting data through the connector.

An operation of a service system using the beacon device 100 configured as described above will be described below with reference to FIG. 5.

Figure 5:
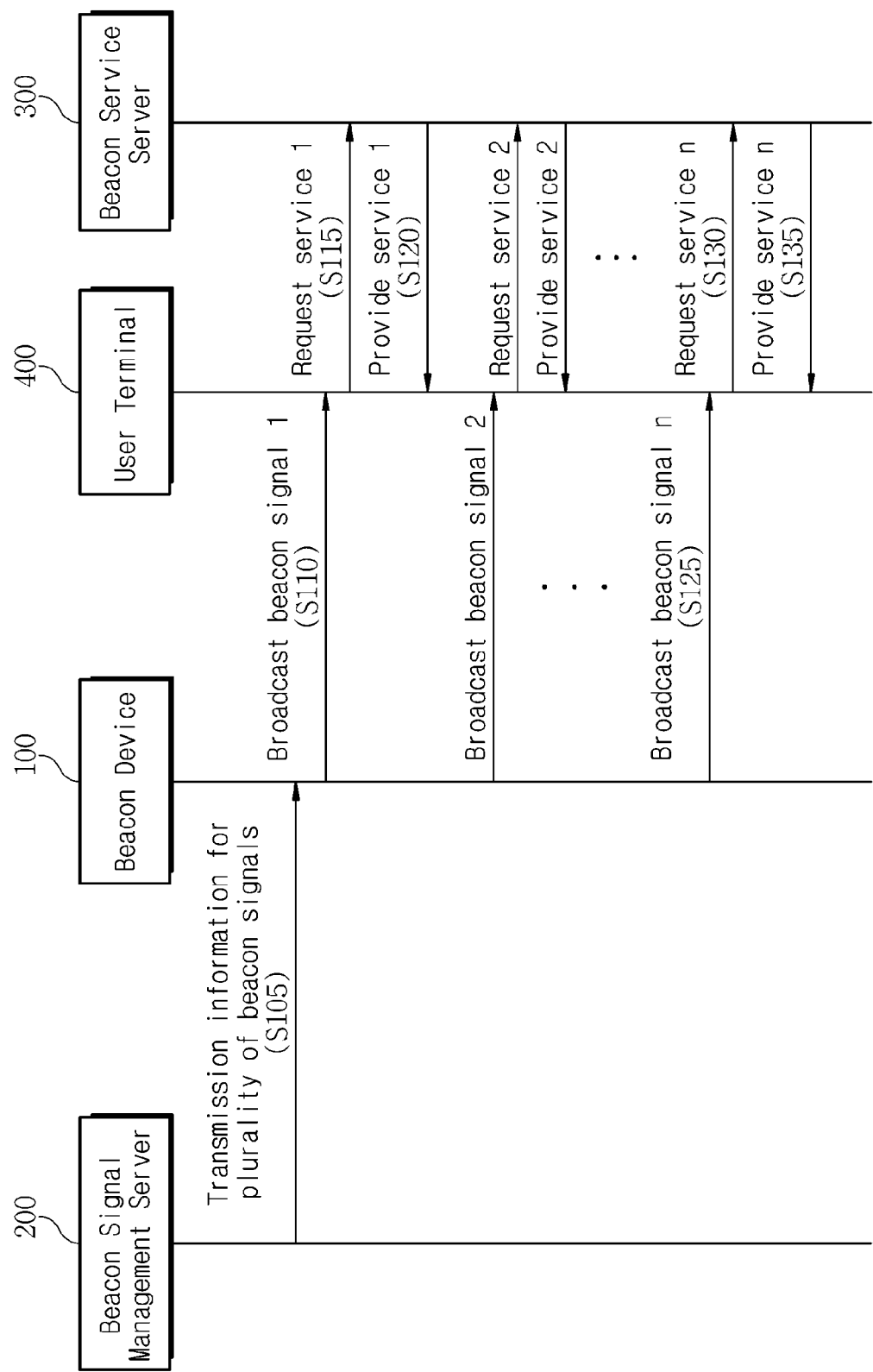
FIG. 5 is a sequence diagram illustrating a service performing process in a beacon service system according to an embodiment of the present invention.

FIG. 5 is a sequence diagram illustrating a service performing process in a beacon service system according to an embodiment of the present invention.

Referring to FIG. 5, when the beacon signal management server 200 is included in the configuration of the beacon service system, the beacon signal management server 200 may transmit transmission information for broadcasting a plurality of beacon signals to the beacon device 100 (S105).

Thus, the beacon device 100 may alternately broadcast the plurality of beacon signals according to the received transmission information (S125). For example, a beacon signal matched with first beacon service information is transmitted to a number of unspecified terminal devices 400.

Any user terminal 400 that has entered communication coverage of the beacon device 100 may receive the first beacon signal through a scanning or detection procedure (S110).

Accordingly, any user terminal 400 among a plurality of user terminals that approach the beacon device 100 may receive the first beacon signal, and any user terminal 400 that has received the first beacon signal may request a beacon service corresponding to the first beacon signal from the beacon service server 300 (S115).

Thus, the beacon service server 300 may provide a first service to the user terminal 400 according to request of a first beacon service by the user terminal 400 (S120).

Likewise, a beacon signal matched with nth beacon service information is transmitted to a number of unspecified terminal devices 400. Any user terminal 400 that has entered communication coverage of the beacon device 100 may receive the nth beacon signal through a scanning or detection procedure (S125).

Accordingly, any user terminal 400 among a plurality of user terminals that approach the beacon device 100 may receive the nth beacon signal, and the user terminal 400 that has received the nth beacon signal may request a beacon service corresponding to the nth beacon signal from the beacon service server 300 (S130).

Thus, the beacon service server 300 may provide an nth service to the user terminal 400 according to request of an nth beacon service by the user terminal 400 (S135).

Figure 6:
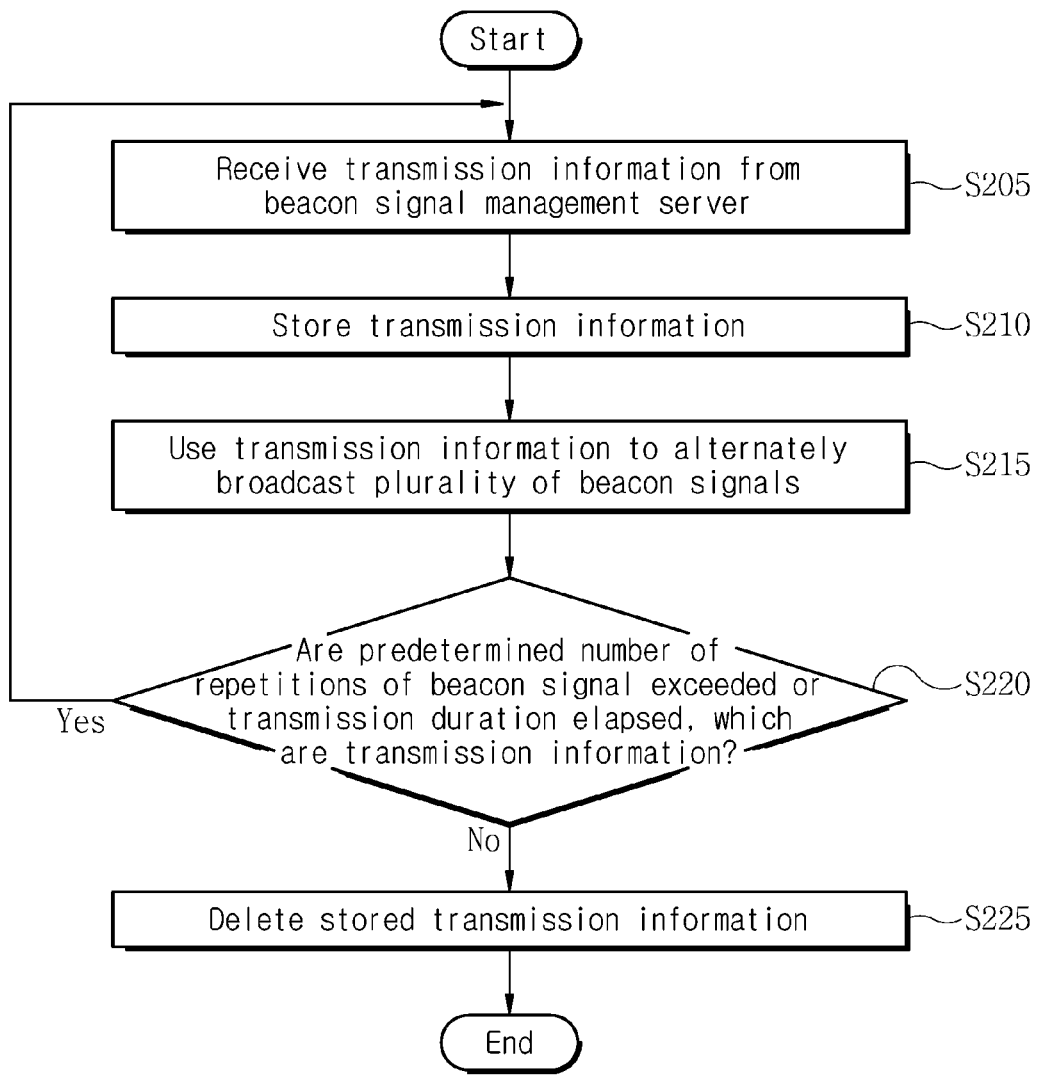
FIG. 6 is a flowchart illustrating a beacon service providing method in a beacon device of the above-described beacon service system according to an embodiment of the present invention.

FIG. 6 is a flowchart illustrating a beacon service providing method in the beacon device 10 of the above-described beacon service system according to an embodiment of the present invention. A method of providing a plurality of beacon services to one beacon device according to an embodiment of the present invention will be described below with reference to FIG. 6.

Referring to FIG. 6, the beacon device 100 may receive transmission information used to broadcast a plurality of beacon signals from the beacon signal management server 200 (S205). The beacon device 100 may store the received transmission information. Furthermore, when there is not the beacon signal management server 200, an administrator may store the transmission information in the beacon device 100 (S210).

Thus, the beacon device 100 may use the stored transmission information to alternately broadcast the plurality of beacon signals (S215). In detail, the beacon device 100 may use the stored transmission information to alternately broadcast the plurality of beacon signals a predetermined number of repetitions in a predetermined beacon signal transmission duration (S215). Accordingly, when the beacon signal transmission duration has elapsed or the predetermined number of repetitions of the beacon signal has been exceeded, the beacon device 100 may receive transmission information for a new beacon signal from the beacon signal management server 200 and broadcast the new beacon signal according to the received transmission information (S220).

Lastly, the beacon device 100 may delete the transmission information stored in the beacon device 100 by initializing the system before the beacon service ends (S225).

Figure 7:
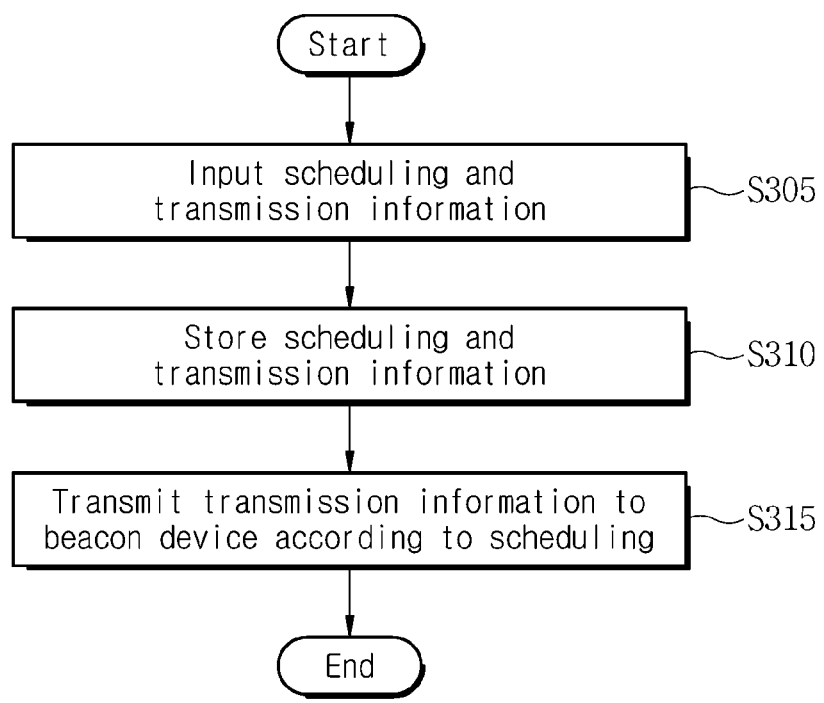
FIG. 7 is a flowchart illustrating a beacon service providing method in a beacon signal management server of the above-described beacon service system according to an embodiment of the present invention.

FIG. 7 is a flowchart illustrating a beacon service providing method in the beacon signal management server 200 of the above-described beacon service system according to an embodiment of the present invention. A method of providing a plurality of beacon services to one beacon device 100 according to an embodiment of the present invention will be described below with reference to FIG. 7.

Referring to FIG. 7, the administrator may input transmission information and scheduling information for managing a plurality of pieces of transmission information to the beacon signal management server 200 (S305). The beacon signal management server 200 may store the input transmission information and scheduling information (S310).

Thus, the beacon signal management server 200 may transmit a plurality of pieces of transmission information that are previously input to the beacon device 100 in an appropriate order at a schedule and a time according to the schedule information (S315).

FIG. 8 is a view showing an example of transmission information that is set when one beacon device provides a plurality of beacon services according to an embodiment of the present invention.

Referring to FIG. 8, transmission information for the plurality of beacon signals may include, for example, overall information for generating the plurality of beacon signals of the beacon device and individual information regarding each of the plurality of beacon signals.

The overall beacon signal information may include one or more of the number of beacon signals, a transmission duration, the number of repetitions, an overall signal interval, and other information.

In the overall beacon signal information, the number of beacon signals may be the number of beacon signals mapped to different pieces of service information broadcast by one beacon device 100. For example, when '2' is input as the number of beacon signals, two different beacon signals are transmitted. This may indicate that two different pieces of service information are provided.

In the overall beacon signal information, the transmission duration may be a period during which the beacon device 100 broadcasts the plurality of beacon signals. For example, when '30000' is input as the transmission duration, the beacon device 100 may broadcast the beacon signal for 30000 seconds.

In the overall beacon signal information, the number of repetitions may be the number of times all of the beacon signals are broadcast when the plurality of beacon signals are alternately transmitted. For example, when '10000' is input as the number of times and the number of beacon signals is 2, the signal transmission may be repeated a total of 10000 times, assuming that one time indicates that the beacon device 100 broadcasts beacon signal 1 and beacon signal 2 in sequence.

Accordingly, a transmission period of the plurality of beacon signals may be set as one of the transmission duration and the number of repetitions.

In the overall beacon signal information, the overall signal interval may refer to an interval between different beacon signals when the plurality of beacon signals are alternately broadcast. For example, on a condition that there are two beacon signals, when '500 msec' is input as the overall signal interval, the beacon device 100 may transmit a different beacon signal every 0.5 seconds. On the other hand, on a condition that there is only one beacon signal, '0' is input as the overall signal interval, and an interval between the beacon signals may be adjusted by an individual signal interval in the individual beacon signal information. This may be intended to prevent system collision due to redundant information between the overall beacon signal information and the individual beacon signal information.

Next, the individual beacon signal information may include beacon signal distinction information (beacon signal number), one or more pieces of identification information for distinguishing a service target from another using one or more ranks (UUID, Major ID, Minor ID), a transmission power intensity, an individual signal interval, and other information.

In the individual beacon signal information, the beacon signal distinction information (e.g., beacon signal number) is information for distinguishing between a plurality of beacon signals to be alternately broadcast.

In the individual beacon signal information, the universally unique identifier (UUID), which is first identification information, is one piece of unique identification information assigned to the service target and may be identification information corresponding to a top rank. For example, service target companies (e.g., department store A) may be distinguished using the UUID.

In the individual beacon signal information, the Major ID and the Minor ID, which are second identification information, have a lower rank than the UUID and are identification information for further distinguishing the service target with the UUID. For example, the Major ID may be set to be used to distinguish between branches of the service target company (e.g., a first shop of department store A), and the Minor ID may be set to be used to distinguish between services provided by the shop (e.g., a first service of the first shop of department store A).

According to an embodiment of the present invention, a combination of the Major ID and the Minor ID may be used as information for distinguishing service information to be provided by the beacon device 100. For example, service information matched with Major ID=1 and Minor ID=1 may be different from service information matched with Major ID=1 and Minor ID=2.

Furthermore, in the individual beacon signal information, the transmission power intensity is information that sets a transmission power intensity of a beacon signal of the beacon device 100. For example, beacon signal 1 may be set to have a transmission power intensity of '70 dBm' while beacon signal 2 may be set to have a transmission power intensity of '50 dBm.' In this way, the plurality of beacon signals may be transmitted in different coverage areas by adjusting the transmission power intensity. The transmission power intensity may vary depending on the type of service information to be provided corresponding to the beacon signal.

In the individual beacon signal information, the individual signal interval may denote a temporal period between signals when one beacon signal is broadcast at certain intervals. For example, on a condition that there is one beacon signal, when '500 msec' is input, the beacon device 100 may transmit the beacon signal every 0.5 seconds. In this case, the overall signal interval that is set in the overall beacon signal information may have a higher priority than the individual signal interval. When the overall signal interval is set in the overall beacon signal information, the individual signal interval may be set as '0.' This is intended to prevent system collision due to redundant information.

The transmission information of the beacon signal is not limited to the above-described items, and an additional item may be created as necessary. Furthermore, the existing items may be used with another meaning according to the purpose.

Figure 9:
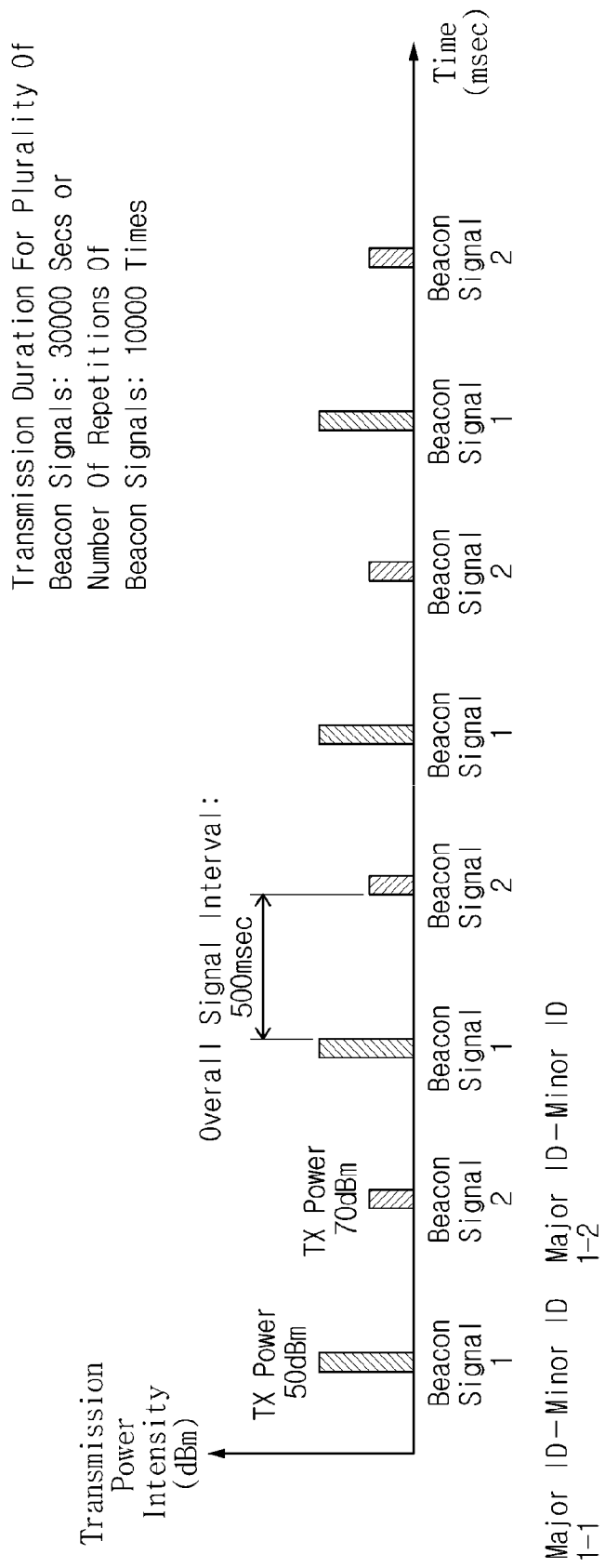
FIG. 9 is a view showing, along a time axis, a plurality of beacon signals generated by a beacon device according to transmission information when one beacon device provides a plurality of beacon services according to an embodiment of the present invention.

FIG. 9 is a view showing, along a time axis, a plurality of beacon signals generated by a beacon device according to transmission information when one beacon device provides a plurality of beacon services according to an embodiment of the present invention.

Referring to FIG. 9, it is assumed that the transmission information has the same numerical values as illustrated in FIG. 8.

As illustrated in FIG. 8, the number of beacon signals is two. Since the overall signal interval is 500 msec, beacon signal 1 and beacon signal 2 may be generated at intervals of 500 msec. Since the transmission duration of the plurality of beacon signals is 30000 sec, and the number of repetitions is 10000, the beacon signal are alternately generated before the transmission duration of 30000 sec has elapsed or the number of repetitions exceeds 10000. Since beacon signal 1 and beacon signal 2 are generated by one beacon device 100, and beacon signals for services provided by the service target company (e.g., department store A), UUIDs of beacon signal 1 and beacon signal 2 may be the same. The beacon signal number of beacon signal 1 is '1' and the Major ID is '1.' The beacon signal number of beacon signal 2 is '2' and the Major ID is '1.' Thus, the shops of the service target company (e.g., a first shop of department store A) may also be the same. Since the Minor ID of beacon signal 1 is '1' and the Minor ID of beacon signal 2 is '2,' which is different from the Minor ID of beacon signal 1, beacon services provided through the signals may be different. The transmission power intensity (Tx Power) of beacon signal 1 is 70 dBm, and the transmission power intensity of beacon signal 2 is 50 dBm, which is different from the transmission power intensity of beacon signal 1. Accordingly, since the transmission power intensity of beacon signal 1 is greater than the transmission power intensity of beacon signal 2, it can be seen that beacon signal 1 is used to provide a service to a user terminal 400 that is located more distant than the coverage of beacon signal 2.

Figure 10:
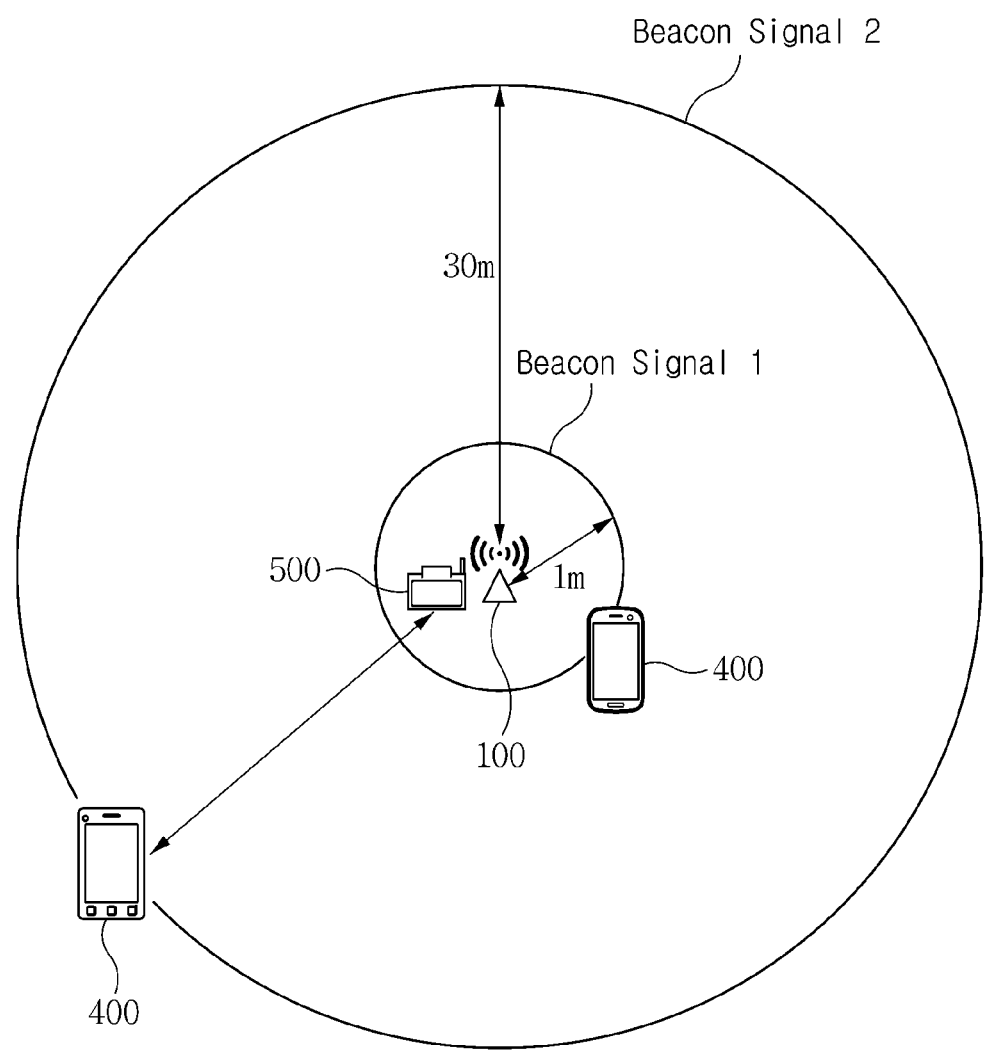
FIG. 10 is a view showing example 1 for showing that one beacon device provides a plurality of beacon services according to an embodiment of the present invention.

FIG. 10 is a view showing example 1 for showing that one beacon device provides a plurality of beacon services according to an embodiment of the present invention.

In an embodiment to be described below, it is assumed that a beacon device 100 is installed on a counter of a certain shop and configured to transmit beacon signal 1 and beacon signal 2 alternately.

Referring to FIG. 10, beacon signal 1 that is broadcast up to 1 meter from the beacon device 100 is intended to provide a stamp service to a customer who has purchased a product at a shop after payment, and beacon signal 2 that is broadcast up to 30 meters from the beacon device 100 is intended to provide a coupon service to all customers who have visited the shop.

Accordingly, the transmission information of beacon signal 1 (within coverage of 1 meter) may be set as −20 dBm, which is less than the transmission power intensity, such that the user terminal 400 located within 1 meter from a counter on which the beacon device 100 is installed may sense the beacon signal. Furthermore, in order to clarify the distinction between the beacon signals, Major ID=1 and Minor ID=1 are set. Accordingly, beacon signal 1 is received by only a user terminal of a customer who approaches a counter for payment, and the customer may receive a stamp service mapped to identification information (i.e., Major ID=1 and Minor ID=1) of beacon signal 1.

Unlike this, the transmission information of beacon signal 2 (within coverage of 30 meters) is set as 5 dBm, which is greater than the transmission power intensity, such that beacon signal 2 may be transmitted up to 30 meters, which is the entire range of the shop. Furthermore, in order to clarify the distinction between the beacon signals, Major ID=1 and Minor ID=2 are set. Beacon signal 2 may be received by user terminals of all customers who have visited the shop, and thus the customers may receive a coupon service mapped to identification information (i.e., Major ID=1 and Minor ID=2) of beacon signal 2.

Accordingly, as described above, the beacon device 100 may provide the coupon service to all customers who have visited the shop and also selectively provide the stamp service to a customer who actually purchases and pays for a product, by alternately transmitting beacon signal 1 and beacon signal 2, in which the transmission information is set as described above.

Figure 11:
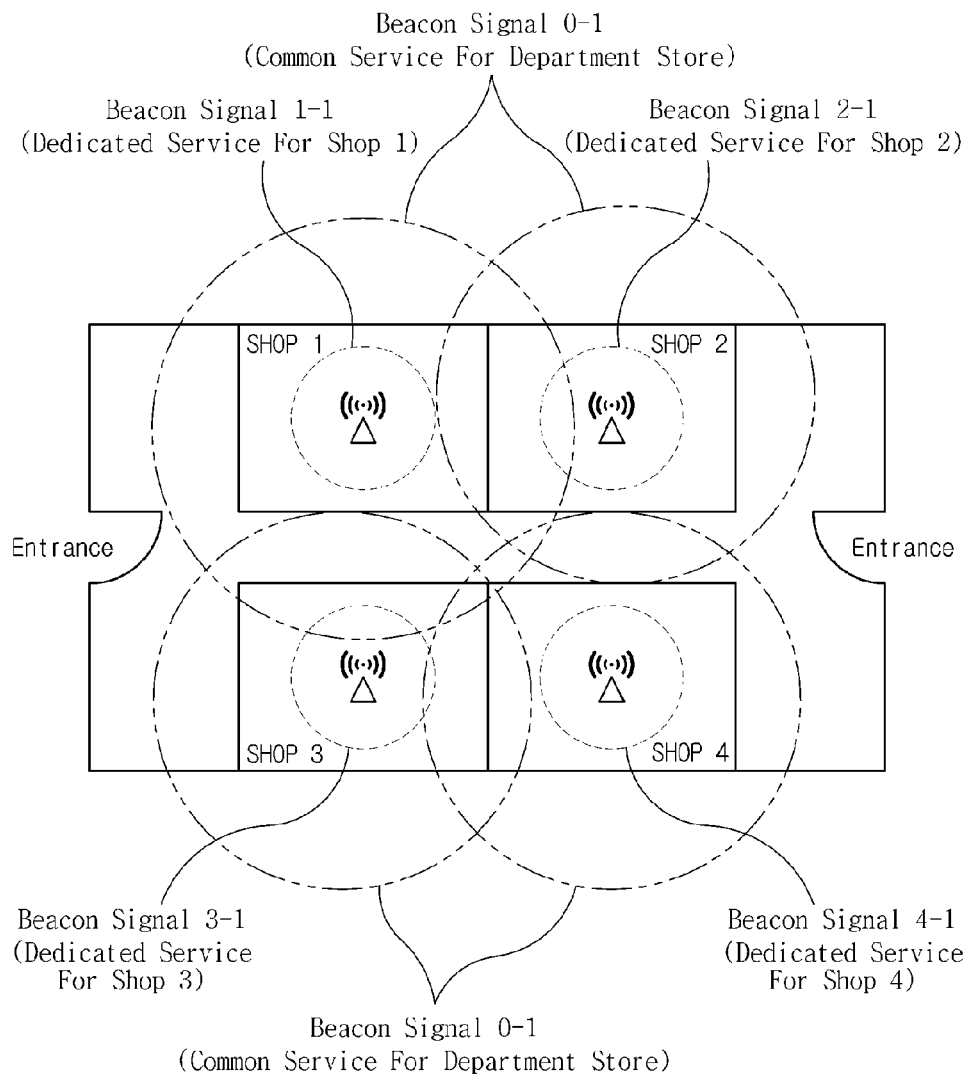
FIG. 11 is a view showing example 2 for showing that one beacon device provides a plurality of beacon services according to an embodiment of the present invention.

FIG. 11 is a view showing example 2 for showing that one beacon device provides a plurality of beacon services according to an embodiment of the present invention.

In an embodiment to be described below, it is assumed that the beacon device 100 is installed on a counter of each shop on the same floor of the same department store and configured to alternately transmit a common service beacon signal for a department store (e.g., beacon signal 0-1) and a dedicated service beacon signal for each shop (e.g., beacon signal 1-1, beacon signal 2-1, beacon signal 3-1, and beacon signal 4-1).

Referring to FIG. 11, there are a plurality of shops in one department store. Basically, one beacon device 100 may be installed in each shop. It is assumed that the beacon signals of the beacon devices 100 have the same UUID corresponding to the top rank because the beacon devices 100 are located in the same department store and thus the same service provider may provide beacon services.

Accordingly, a plurality of beacon signals broadcast by the beacon device 100 may have service types distinguished by the Major ID and Minor ID corresponding to a lower rank.

A common service of the department store may be provided to user terminals 400 located in all regions of the department store. To this end, since a beacon signal mapped to the common department store service should be transmitted to all regions in the department store, the beacon signal may be broadcast to the beacon devices 100 installed in all shops of the department store. This may be implemented by adjusting the transmission power intensity. For transmission information that is used to generate the plurality of beacon signals, the beacon signal may be set to have Major ID=0 and Minor ID=1.

There may be a beacon service provided only by shop 1. In addition, a plurality of beacon services may also be provided by shop 1.

A shop-1-dedicated service provided only by shop 1 may be provided to the user terminals 400 located in a region of shop 1. To this end, since a beacon signal mapped to the shop-1-dedicated service should be transmitted only to the region of shop 1, the beacon signal may be broadcast only by the beacon device 100 installed in shop 1. This may be implemented by adjusting the transmission power intensity. For transmission information that is used to generate the plurality of beacon signals, the beacon signal mapped to the shop-1-dedicated service may be set to have Major ID=1 and Minor ID=1.

Furthermore, when there are two shop-1-dedicated services, a beacon signal of another shop-1-dedicated service having Major ID=1 and Minor ID=2 may be broadcast from the beacon device 100 of shop 1.

Likewise, shop 2, shop 3, and shop 4 may provide dedicated beacon services of the shops.

To this end, the beacon device 100 of each shop may broadcast a plurality of beacon signals in the same beacon service providing method as that in shop 1.

The method according to an embodiment of the present invention may be implemented in the form of software that is readable by various computer means and may be recorded on a computer-readable recording medium. Here, the recording medium may include a program instruction, a data file, a data structure, or a combination thereof. The program instruction recorded on the recording medium may be designed and configured specifically for the present invention or can be publicly known and available to those who are skilled in the field of computer software.

Examples of the recording medium include a magnetic medium such as a hard disk, a floppy disk, and a magnetic tape, an optical medium such as a CD-ROM, a DVD, etc., a magneto-optical medium such as a floptical disk, and a hardware device such as a ROM, a RAM, a flash memory, etc. that is specially configured to store and perform the program instruction. Examples of the program instruction include a high-level language code executable by a computer with an interpreter, in addition to a machine language code made by a compiler. The above exemplary hardware device can be configured to operate as one or more software modules in order to perform the operation of the present invention, and vice versa.

Furthermore, the beacon device 100 according to an embodiment of the present invention may be driven by an instruction for enabling one or more processors to perform the above-described functions and processes. Such instructions can, for example, comprise interpreted instructions, such as script instructions, e.g., JavaScript or ECMAScript instructions, or executable code, or other instructions stored in a computer-readable medium. Furthermore, the device according to an embodiment of the present invention may be distributively implemented over a network, such as a server farm, or may be implemented in a single computer device.

Implementations of the subject matter and the functional operations described in this specification can be provided in digital electronic circuitry, or in computer software, firmware, or hardware, including the structures disclosed in this specification and their structural equivalents, or in combinations of one or more thereof. Embodiments of the subject matter described in this specification can be implemented as one or more computer program products, i.e., one or more modules of computer program instructions encoded on a tangible program carrier for execution by, or to control the operation of, a data processing apparatus. The computer-readable medium can be a machine-readable storage device, a machine-readable storage substrate, a memory device, a composition of material effecting a machine-readable propagated signal, or a combination of one or more thereof.

The term "system" used herein encompasses all apparatus, devices, and machines for processing data, including by way of example, a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more thereof.

A computer program (also known as a program, software, software application, script, or code) can be written in any form of a programming language, including compiled or interpreted languages, or declarative or procedural languages, and it can be deployed in any form, including as a stand-alone program or as a module, component, subroutine, or other unit suitable for use in a computing environment. The computer program does not necessarily correspond to a file of a file system. The program may be stored in a single file provided to a requested program, in interoperating multiple files (for example, files each storing some of one or more modules, lower level programs, or codes) or in a part of a file containing other programs or data (for example, one or more scripts stored in a markup language document). The computer program may be located on a single site or over a plurality of sites in a distributed fashion and developed so as to be executed on multiple computers connected to one another through a communication network or on a single computer.

The disclosed embodiments can be implemented in a computing system that includes a back-end component, e.g., a data server, or that includes a middleware component, e.g., an application server, or that includes a front-end component, e.g., a client computer having a graphical user interface or a web browser through which a user can interact with an implementation of what is disclosed here, or any combination of one or more such back-end, middleware, or front-end components. The components of the system can be interconnected by any form or medium of digital data communication, e.g., a communication network.

While this specification contains many specifics, these should not be construed as limitations on the scope of what being claims or of what may be claimed, but rather as descriptions of features specific to particular embodiments. Features described in the specification in the context of individual embodiments may be implemented as a combination in a single embodiment. In contrast, features described in the specification in the context of a single embodiment may be implemented in multiple embodiments individually or in an appropriate sub-combination. Furthermore, the features may operate in a certain combination and may initially described as claimed in the combination, but one or more features may be excluded from the claimed combination in some cases, and the claimed combination may be changed into a sub-combination or a modification of a sub-combination.

Similarly, even though operations are described in a certain order on the drawings, it should not be understood that the operations be executed in the certain order or in a sequential order to obtain desired results, or that all the operation be executed.

In some cases, multitasking and parallel processing may be beneficial. In addition, it should not be understood that the separation of various system components in the above described embodiments is required in all embodiments, and it should be understood that the above described program components and systems may be incorporated into a single software product or may be packaged in multiple software products.

Thus, particular embodiments have been described. Other embodiments are within the scope of the following claims. For example, the operations recited in the claims can be performed in a different order and still achieve desirable results. As an example, operations depicted in the drawings in a particular order should not be understood as requiring that such operations be performed in the particular order shown or in sequential order. In certain implementations, multitasking and parallel processing may be advantageous.

The description suggests the best mode of the present invention to provide an example that explains the present invention and also enables one skilled in the art to manufacture and use the present invention. The specification drafted as such is not limited to detailed terms suggested in the specification. Accordingly, it will be apparent to those skilled in the art that various modifications, changes, and variations may be made in the example without departing from the scope of the invention.

Accordingly, the scope of the present invention should be defined not by the embodiments but by the appended claims.

According to an embodiment of the present invention, one beacon device can provide a plurality of services while one conventional beacon device can provide only one service.

In addition, when the beacon signal management server is used, it is possible to simply change the transmission information of the beacon signal.

Thus, according to an embodiment of the present invention, a plurality of beacon device are not needed to provide the plurality of services, thereby reducing installation and operating costs of the beacon device.

In this specification, exemplary embodiments of the present invention have been classified into the first, second and third exemplary embodiments and described for conciseness. However, respective steps or functions of an exemplary embodiment may be combined with those of another exemplary embodiment to implement still another exemplary embodiment of the present invention.

What is claimed is:

1. A beacon signals transmission method for providing a plurality of beacon services, the beacon signal transmission method performed by a beacon device, the beacon signals transmission method comprising:
   checking transmission information for beacon signal transmission; and
   transmitting a plurality of beacon signals defined according to an overall signal interval written in the checked transmission information,
   wherein the plurality of beacon signals are transmitted in different coverage areas according to predefined transmission information to provide corresponding beacon services using different transmission power intensities,
   wherein the checking of the transmission information includes checking scheduling information for the transmission information when there are a plurality of pieces of transmission information, and
   wherein the transmitting of the plurality of beacon signals includes controlling the plurality of beacon signals to be transmitted according to each of the plurality of pieces of transmission information in consideration of the scheduling information.

2. The beacon signals transmission method of claim 1, wherein the checking of the transmission information includes,
   receiving the transmission information and the scheduling information from a beacon signal management server,
   storing the received transmission information and scheduling information, and
   checking the stored transmission information and scheduling information.

3. The beacon signals transmission method of claim 1, wherein the transmission information comprises
   overall information including a number of beacon signals and the overall signal interval, and defined to transmit the plurality of beacon signals, and
   individual information defined corresponding to each of the plurality of beacon signals according to the number of beacon signals and including identification information and different transmission power intensities defined corresponding to each of the plurality of beacon signals.

4. The beacon signals transmission method of claim 3, wherein the transmitting of a plurality of beacon signals includes
   checking the number of beacon signals and the overall signal interval defined in the overall information,
   checking the different transmission power intensities for each of the plurality of beacon signals defined in the individual information, and
   transmitting the plurality of beacon signals corresponding to the number of beacon signals according to the overall signal interval according to the different transmission power intensities, and
   wherein the plurality of beacon signals are transmitted by including differently defined identification information to provide a beacon service.

* * * * *